(12) United States Patent
Forestier et al.

(10) Patent No.: US 9,302,849 B2
(45) Date of Patent: Apr. 5, 2016

(54) METHOD OF CONTROLLING OPERATION OF A PNEUMATIC CONVEYING SYSTEM

(75) Inventors: Niklas Mattias Forestier, Göteborg (SE); Martin Alfrost, Göteborg (SE)

(73) Assignee: Envac AB, Stockholm (SE)

(*) Notice: Subject to any disclaimer, the term of this patent is extended or adjusted under 35 U.S.C. 154(b) by 0 days.

(21) Appl. No.: 14/391,078

(22) PCT Filed: May 3, 2012

(86) PCT No.: PCT/EP2012/058158
§ 371 (c)(1),
(2), (4) Date: Oct. 7, 2014

(87) PCT Pub. No.: WO2013/164030
PCT Pub. Date: Nov. 7, 2013

(65) Prior Publication Data
US 2015/0321843 A1    Nov. 12, 2015

(51) Int. Cl.
B65G 53/00    (2006.01)
B65F 5/00     (2006.01)
B65G 53/66    (2006.01)

(52) U.S. Cl.
CPC ............. B65F 5/005 (2013.01); B65G 53/66 (2013.01)

(58) Field of Classification Search
USPC ........ 406/58, 14, 30, 122, 127, 197; 137/255, 137/571
See application file for complete search history.

(56) References Cited

U.S. PATENT DOCUMENTS

| | | | | |
|---|---|---|---|---|
| 1,725,782 A * | 8/1929 | De Florez | ............. | G05D 7/018 137/10 |
| 4,029,362 A * | 6/1977 | Kortenbusch | .......... | B65G 53/30 406/109 |
| 4,917,544 A * | 4/1990 | Crahan | .................. | B65G 53/66 406/119 |
| 5,009,551 A * | 4/1991 | Swartz | .................. | B65G 53/66 222/368 |
| 5,114,280 A * | 5/1992 | Ushitora | ................. | E03F 1/006 137/236.1 |
| 5,660,198 A * | 8/1997 | McClaran | ............ | G05D 16/106 137/10 |
| 7,279,076 B2 * | 10/2007 | Yada | ........................ | B01D 3/14 137/14 |
| 8,360,691 B2 * | 1/2013 | Moretto | ................. | B65G 53/66 406/122 |
| 8,747,029 B2 * | 6/2014 | Thorn | .................... | B65G 53/66 406/127 |
| 2015/0027552 A1 * | 1/2015 | Hsu | ................... | H01L 21/67017 137/10 |

FOREIGN PATENT DOCUMENTS

| | | |
|---|---|---|
| KR | 2010-0083021 A | 7/2010 |
| WO | 2009/022964 A1 | 2/2009 |
| WO | 2009/096849 A1 | 8/2009 |
| WO | 2011/108971 A1 | 9/2011 |

* cited by examiner

*Primary Examiner* — Joseph Dillon, Jr.
(74) *Attorney, Agent, or Firm* — Capitol City TechLaw

(57) ABSTRACT

In a method of controlling operation of a pneumatic conveying system (1) including a source (6) for generating transport air flow in an active state, transport piping (4) and multiple material inlet points in at least one branch (B1, B2, B3, B4) of the transport piping and communicating with the system through discharge valves (3) controlling emptying of associated material inlet points, material transport conditions of the system are sensed for each inlet point emptying operation, the material transport conditions are sensed at one or more remote locations from the material inlet points and a valve open time for the material inlet point discharge valves is determining for each emptying operation and based on a processing of feedback from material transport condition sensors (11, 12) of the system. A pneumatic conveying system as well as a system (16) for controlling operation of the pneumatic conveying system are also provided.

10 Claims, 5 Drawing Sheets

METHOD OF CONTROLLING OPERATION OF A PNEUMATIC CONVEYING SYSTEM

TECHNICAL FIELD

This disclosure generally concerns pneumatic conveying systems and in particular relates to controlling the operation of such systems having multiple material inlet points being provided in at least one system branch and each communicating with the system through an associated opening and closing discharge valve.

BACKGROUND

Pneumatic conveying systems of the kind having several inlet points for conveyed material normally include valves controlling the discharge of material from each of the inlets and into a transport pipe net. Valves having such a function will in this specification be referred to as "discharge valves". Such pneumatic conveying systems involve a few typical situations when the behavior of the discharge valves needs to be individually configured with respect to operation time. This individual valve configuration normally includes setting a time/delay before opening a first discharge valve of a branch after activating the branch by generating air flow therein. The individual time/delay configuration of the discharge valves of the material inlets serves to ensure appropriate transport airspeed in the branch. In the case of a system involving several branches the set time/delay for the first discharge valve of each branch starts after switching active branch by opening the appropriate air inlet valve. The individual valve configuration may further include setting a proper time/delay between consecutive openings of discharge valves in order to avoid overloading the system.

Presently, both of the above mentioned operation times/delays are normally individually configured for each branch of a multiple branch system and thus for each valve depending on its localization along the transport pipe net and also depending on its typical material production ratio. Optimization of a system configuration with respect to efficiency—may in this field be specified as energy per amount of transported material—involves finding as low time/delay values as possible without interfering with safe material transport. Any static or predefined configuration must have built-in compensation for "worst-case" situations and variations and will have sub-optimal efficiency under average working conditions.

WO 2011/108971 A1 discloses sensors provided in direct association with a storage space of a pneumatic material collection and transport system. The sensors are of a type suitable for detecting waste remaining in a storage space. They are used to detect when a storage space has been adequately emptied so that its discharge valve may be closed and an emptying cycle of a next storage space in a system emptying sequence may be initiated with minimum delay.

SUMMARY

It is a general object of this disclosure to provide a solution to the described problems.

In particular it is an object of this disclosure to suggest a method of controlling operation of a pneumatic conveying system.

In particular it is another object of this disclosure to suggest a pneumatic conveying system being configured for controlling operation thereof.

In particular it is a further object of this disclosure to suggest a control system for controlling operation of a pneumatic conveying system.

These and other objects are met by embodiments as defined by the accompanying claims.

The present technology generally relates to a method of controlling operation of a pneumatic conveying system that includes a source that in an active state thereof generates material transport pressure in the system, transport piping and multiple material inlet points. The inlet points are provided in each of a number of branches of the transport piping and communicate with the system through discharge valves controlling an emptying operation of associated material inlet points. Transport air flow is enabled in the branches by opening associated air inlets. In a basic configuration the method of the present technology involves sensing, for each of a number of material inlet point emptying operations, material transport conditions of the system, sensing the material transport conditions by means of material transport condition sensors of the system at one or more remote locations with regard to the material inlet points and determining, for each of said number of material inlet point emptying operations, a valve open time for the discharge valve of said material inlet point based on a processing of feedback from said material transport condition sensors of the system.

In accordance with another aspect the technology relates to a pneumatic conveying system that includes a source for generating transport air flow in an active state, transport piping and multiple material inlet points. The inlet points are provided in at least one transport piping branch and communicate with the system through associated discharge valves controlling an emptying operation of associated material inlet points. In a basic configuration the system includes system condition sensors provided at a remote location from the system material inlet points and arranged in communication with the transport piping for sensing material transport conditions of the system, means for processing feedback from the material transport condition sensors, means for determining a valve open time for material inlet point discharge valves of the transport piping and discharge valve control means for outputting discharge valve activating signals in dependence upon determined valve open times.

According to a further aspect the technology relates to a control system for controlling operation of a pneumatic conveying system that includes a source for generating transport air flow in an active state, transport piping and multiple material inlet points. The inlet points are provided in at least one transport piping branch and communicate with the conveying system through discharge valves controlling an emptying operation of associated material inlet points. In a basic configuration the control system includes means for remote sensing of material transport conditions of the system during inlet point emptying operations, means for processing feedback from the means for sensing material transport conditions, means for determining a valve open time for each material inlet point discharge valve of the transport piping and discharge valve control means for outputting discharge valve activating signals in dependence upon determined valve open times.

These basic configurations present the advantages of:
Optimized system emptying operation; by
Maintaining optimal system material loading ratio;
Energy efficient emptying; and
Secure, disturbance-free emptying.

Preferred further developments of the basic technology and embodiments thereof are specified in the dependent subclaims.

Advantages offered in addition to those described above, will be readily appreciated upon reading the below detailed description of embodiments.

BRIEF DESCRIPTION OF THE DRAWINGS

Further objects and advantages of the present technology will be best understood by reference to the following description taken together with the accompanying drawings, in which.

DETAILED DESCRIPTION

Figure 1:
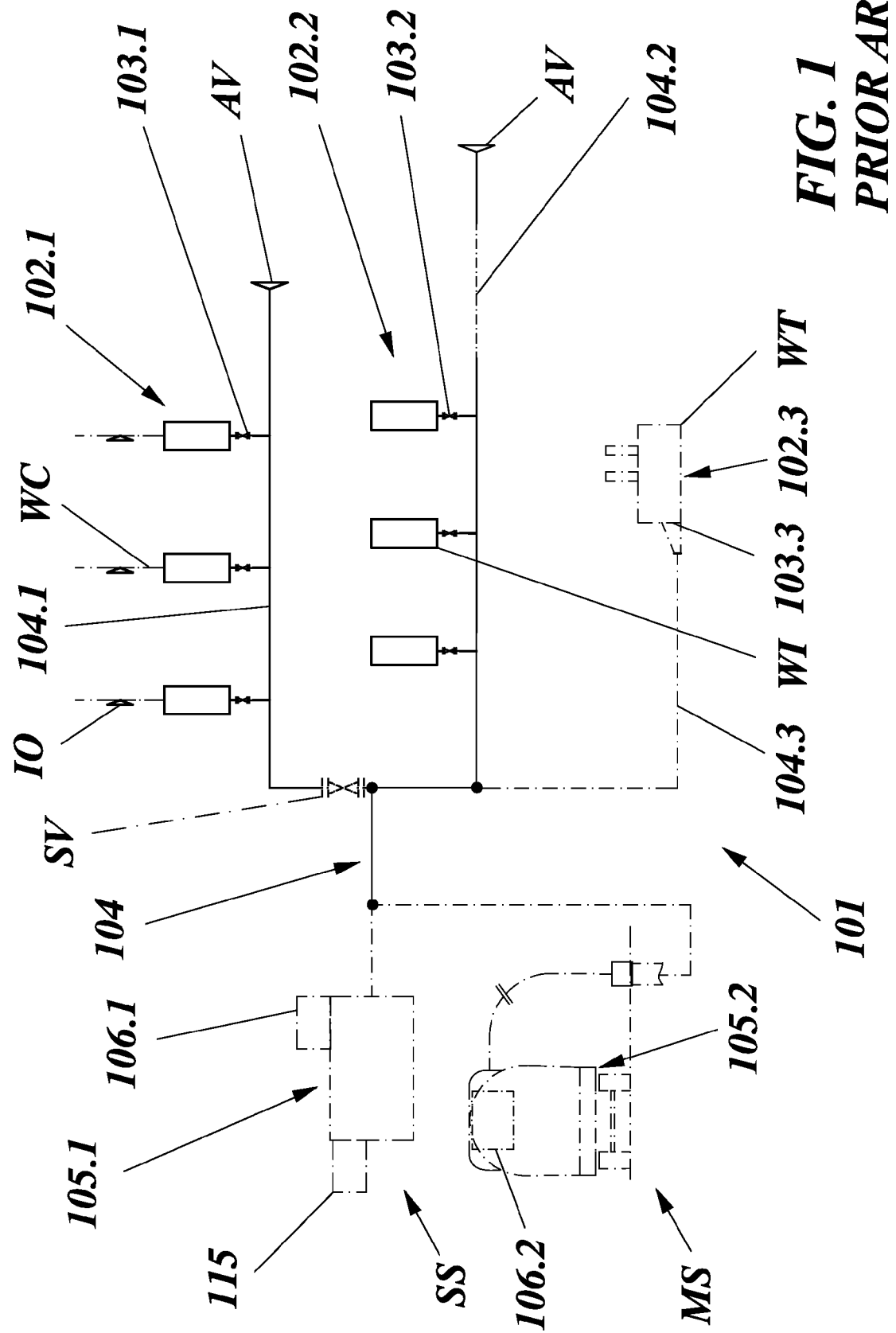
FIG. 1 is a schematical illustration showing examples of pneumatic conveying systems.
Figure 2:
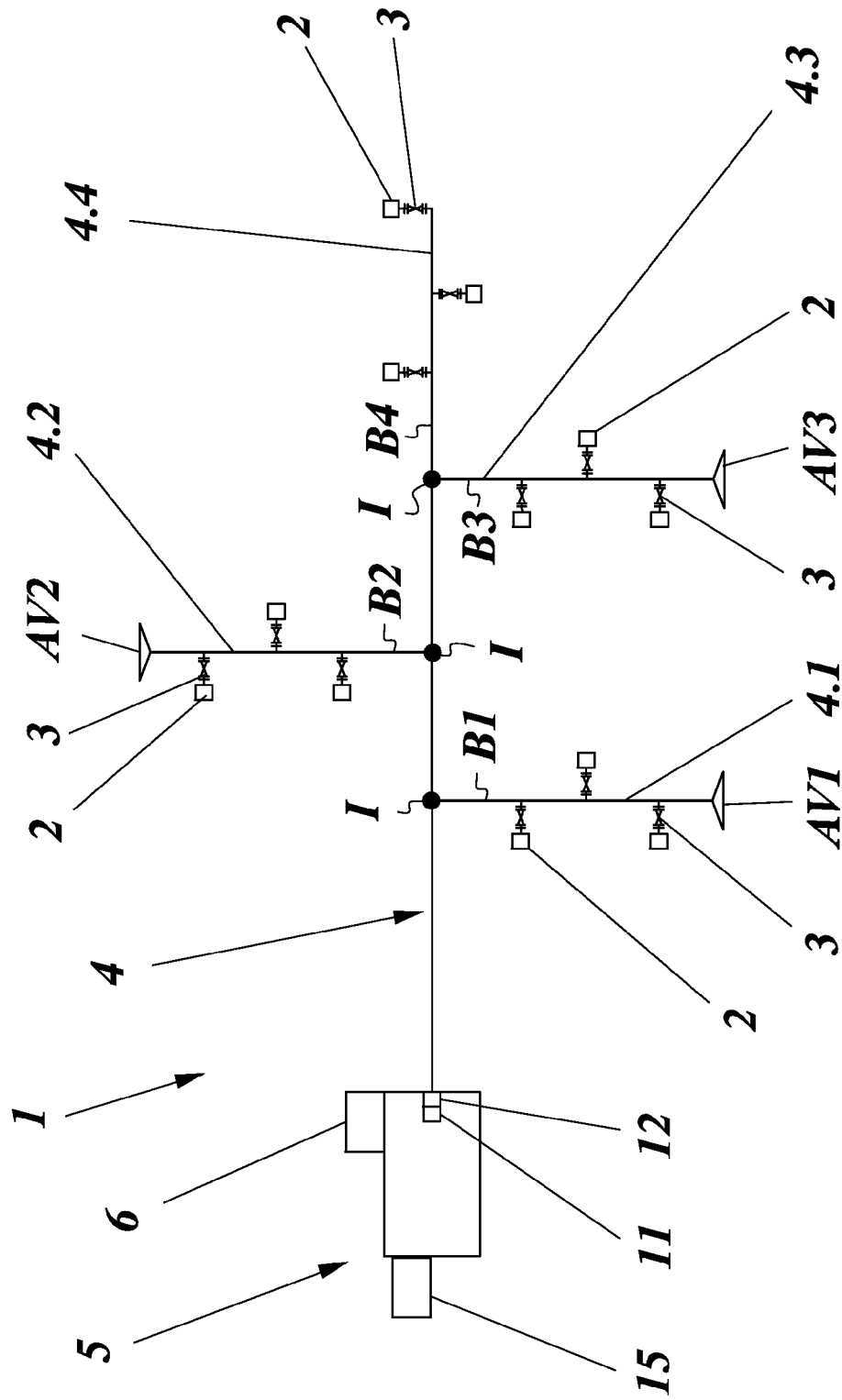
FIG. 2 is a schematical illustration of an exemplary pneumatic conveying system.

The present technology will be explained below with reference to exemplifying embodiments of a method of controlling operation of a pneumatic conveying system, of a pneumatic conveying system as such as well as of a system for controlling operation of such a pneumatic conveying system. They relate to an application of the present technology to vacuum operated conveying systems and the present technology may specifically be applied in the waste collection field or in other fields where material is conveyed by air flow. It is emphasized that the systems schematically illustrated in the attached FIGS. 1 and 2 are only given as examples of environments where the present technology may be applied. This technology is equally well suited for application to other types of environments and for other types of systems. Thus, the illustrations have the sole purpose of describing preferred embodiments of the present technology and are not intended to limit the technology to details or to any specific field of application. It shall be realized that the disclosure covers the incorporation of features related to other applications and any combination of features disclosed herein.

In the attached FIG. 1 are illustrated examples of general configurations for existing pneumatic conveying systems 101 used within the waste collection and managing field. In such existing vacuum operated systems waste is collected in various areas, such as residential, office or hospital areas. The systems 101 include main transport piping 104 that at least in larger systems has pipe branchings for directly connecting to material or, in this case, waste inlet points 102.1, 102.2, 102.3, or for sectioning the main piping 104 in several pipe branches 104.1, 104.2, 104.3. Waste is thus transported in the pipe branches 104.1, 104.2, 104.3 and then in the transport piping 104. In this drawing figure a waste system 101 is illustrated that may either be a stationary type system SS where waste is transported to a collection central or terminal 105.1 by means of vacuum generated at said station or a mobile type system MS where waste is transported to a waste truck 105.2 by vacuum generated onboard the truck.

The collection central 105.1 of the stationary type system SS may be any conventional terminal known to the art. It has a vacuum source 106.1, such as one or several strong exhausters, filter equipment, silencers, a compactor and/or separator and a storage capacity in the form of one or several containers or tanks for the collected and normally compacted waste. In the mobile type system MS vacuum is communicated to the transport piping 104 through a docking point for a suction tube of a vacuum vehicle 105.2. The vacuum vehicle 105.2 may be any type of conventional mobile collection unit including a conventional vacuum truck normally having its own onboard vacuum source 106.2 for applying primary or secondary vacuum air flow and waste separating, compacting and storing equipment. The mentioned collection central equipment and vacuum vehicle equipment may be of any standard type used for such systems and will therefore not be specifically described or illustrated in detail herein. Alternatively combinations of such systems may be used (examples thereof are disclosed in our International Patent Application PCT/SE2008/050569, which published as WO 2009/022964 A1).

Waste is emptied from the waste inlet points 102.1, 102.2, 102.3 that may be in the form of waste chutes WC extending through multi-story buildings, free-standing waste inserts WI and/or waste tanks WT. From said waste inlet points 102.1, 102.2, 102.3 the emptied waste is conveyed to the collection central 105.1 or waste truck 105.2, respectively. The waste chutes WC normally comprise a waste gravity chute of which only the lower part is partially illustrated here and which may have an optional number of waste insertion openings IO (only one indicated). Waste inlet points 102.2 being provided in the form of free standing waste inserts WI are normally positioned outdoors, above ground, and provided with at least one insertion opening (not specifically illustrated or denoted) where waste or litter may be introduced. Waste chutes WC as well as waste inserts WI are preferably provided at appropriate positions directly above a transport pipe branch 104.1, 104.2 of the vacuum conveying system 101 to allow for a gravity feed of waste into the respective transport pipe or branch.

In the described type of existing systems 101 an emptying operation is normally initiated by applying vacuum to the main transport piping and by activating the main piping 104 or, in the applicable case, a selected pipe branch 104.1, 104.2, 104.3. The activation is performed by opening an air inlet valve AV for the system or for the selected branch. For systems employing waste tanks WT as waste inlet points 102.3 the air intake is normally directly associated with the waste tank and has not been specifically indicated in the drawing figure.

In systems that are sectioned or branched into several pipe branches 104.1, 104.2, 104.3 it may in some cases be advisable to provide sectioning valves SV in selected or all pipe branches 104.1, 104.2, 104.3. Such sectioning valves SV may to some degree improve waste transport efficiency and overall waste transport economy of the system 101 and its piping 104. This is due to the fact that such sectioning valves close off the volume of the otherwise open but inactive branches so that the system will not require high air velocity and thus overcapacity of the vacuum producing machines. In systems including sectioning valves the activation of a branch may require the opening of both the respective sectioning and air inlet valves.

The waste inlet points 102.1, 102.2, 102.3 are each associated with an openable and closable discharge valve 103.1, 103.2, 103.3 so that when opened the valve opens, communication between the inlet points 102.1, 102.2, 102.3 and the relevant transport pipe branch 104.1, 104.2, 104.3 for discharging waste to the transport piping 104 and to the relevant waste truck 105.2 or collection central 105.1. When closed, the discharge valves 103.1, 103.2, 103.3 block an outlet from the inlet points 102.1, 102.2, 102.3 to provide a seal between the same and the system transport piping 104.

Waste that has been inserted into the waste inlet points 102.1, 102.2, 102.3 will be discharged therefrom in a controlled or preset sequence during an active phase of the system 101. Specifically, each waste inlet point 102.1, 102.2, 102.3 will be emptied into the designated transport pipe branch 104.1, 104.2, 104.3 when the branch is activated and the associated discharge valve 103.1, 103.2, 103.3 is opened.

The vacuum waste collection system 101 further comprises a control system 115 (only indicated for the stationary type system SS) for controlling emptying and transport of waste in the conveying system. The control system 115 is generally configured to control emptying of waste from the waste inlet points 102.1, 102.2, 102.3 into the system transport piping 104 as well as the suction transport of waste from different branches 104.1, 104.2, 104.3 of the transport piping 104 to the collection central 105.1 or to the waste truck 105.2. This is done by controlling discharge valves, air inlet valves, sectioning valves and vacuum application to the system according to accepted control technology.

The invention is not concerned with the specific design of discharge valves, air inlets, air inlet valves and/or sectioning valves, which are all well known in the art and may be of any conventional type used in vacuum waste collection systems.

The problems that were briefly discussed in the introduction relate to the energy consumption of pneumatic conveying systems that is caused by less than optimal energy efficiency. To this contributes considerable delay times before activating the emptying of branches to secure that appropriate systems conditions have been generated. Another contributing factor is time delays between individual waste inlet point emptying operations to secure against system overloading. With existing technology the emptying delay times are preset based on static or calculated parameters such as localization in the transport piping or expected load of particular waste inlet points. In combination with the required built-in compensation for extreme situations this means that the systems are not optimized with regard to energy efficiency.

The present technology attempts to overcome the shortcomings and problems associated with the conventional use of static and predefined emptying control parameters. A new approach for controlling the emptying operation is proposed. In accordance therewith the prior art predefined operation times are replaced or supplemented by using a dynamic model for valve open decisions based on remote sensor feedback. This inventive concept enables practical and efficient use of the system in a safe and energy efficient way.

For exemplification purposes an embodiment in real application of the present technology is shown in FIGS. 2-5. FIG. 2 shows a schematical pneumatic waste conveying system 1 of the stationary type, as generally described above, and FIG. 3 shows a schematic flow diagram of a sequence of a method of controlling operation of the pneumatic conveying system 1.

An exemplifying implementation of the present technology in a pneumatic conveying system 1 is illustrated in FIG. 2. This system 1, like the above described existing system 101, includes the vacuum source 6 for generating transport air flow in an active state thereof, a main transport piping 4 and multiple material inlet points 2 being provided in system branches B1, B2, B3, B4 of the main transport piping 4. The material inlet points 2 communicate with the transport piping 4 of the conveying system 1 through associated discharge valves 3 controlling an emptying operation of associated material inlet points 2. The four branches B1, B2, B3, B4 are branched off from the main piping 4 via intersections I and are activated when the vacuum source 6 of the collection central 5 operates and its generated vacuum is communicated to the main piping 4, such as by opening a main vacuum valve 9 (see FIG. 5). Specifically, the branches B1, B2, B3 are in this embodiment of the system (without sectioning valves) individually activated by opening the associated air inlet valves AV1-AV3. In an alternative branch configuration one or more branches may lack the common air inlet valve, as is exemplified by branch B4 in FIG. 2. In such a case the inlet for transport air is associated with the waste inlet points or with their respective discharge valves 3, in a manner that is not specifically illustrated. The invention is thus equally well applicable to pneumatic conveying systems having such an alternative air inlet configuration.

In the activated state of a selected branch B1, B2, B3, B4, waste is emptied from successive waste inlet points 2 therein and is discharged into the activated branch B1, B2, B3, B4 by the opening of associated discharge valves 3. When opening a discharge valve 3, waste from the associated waste inlet point 2 is discharged into vacuum air flow in the activated branch B1, B2, B3 or B4. The waste is then transported by said vacuum air flow through said branch and the main piping 4 towards the collection central 5 that serves to collect the pneumatically transported or conveyed material. When the waste inlet points 2 of a branch have been emptied, the branch is deactivated by closing the corresponding air inlet valve AV1-AV3.

The emptying sequence of the individual waste inlet points 2 of the branches B1, B2, B3 or B4 and the activation sequence of individual branches B1, B2, B3 or B4 are normally controlled by a computer implemented emptying control system 15. Such overall control systems may determine the order of emptying individual branches, waste inlet points or groups thereof and other related timed process operations, such as pre-suction times, intermediate times and transport times. Such overall emptying and transport sequence control is based on one or several parameters. The parameters may vary from being only the fill level at the waste inlet points or the waste inlet point distances from the collection central, to being a complex combination of system layout, system specification and system capacity or occupation.

Figure 5:
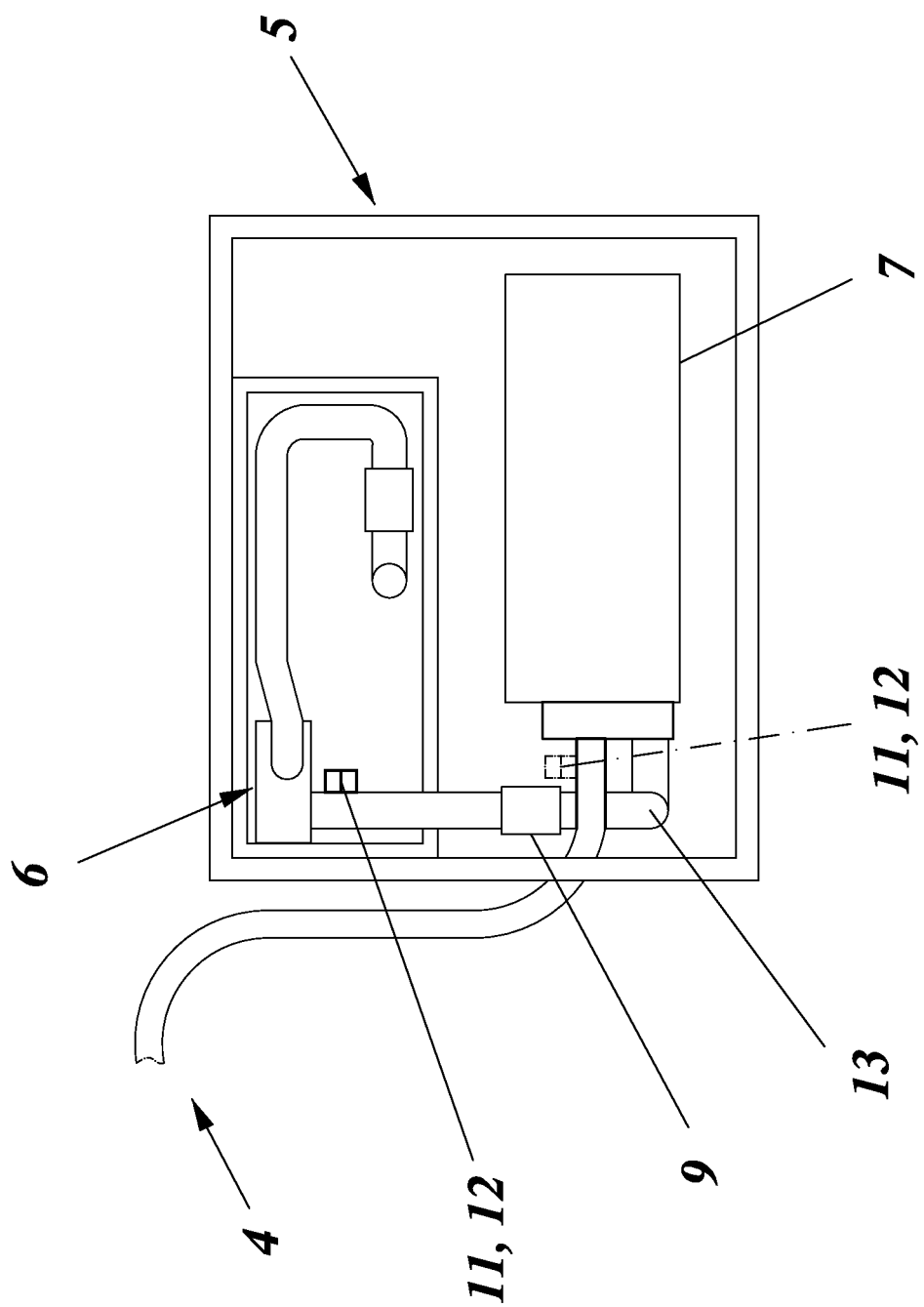
FIG. 5 is a schematic illustration of alternative transport condition sensor positioning by a collection central.

As is clear from FIG. 2 the exemplifying pneumatic conveying system 1 of the present technology is equipped with later described sensors 11, 12 that are provided for sensing material transport conditions of the system 1. The sensors 11, 12 are configured to continuously sense pressure and air speed, respectively, during all active phases of the conveying system 1, i.e. when the vacuum source 6 is active and, in applicable cases, when the main vacuum valve 9 is open. The sensors 11, 12 are provided at one or more remote locations with regard to the material inlet points 2 of the system and are arranged in communication with the transport piping 4 for sensing the system transport conditions. Preferably, sensors 11, 12 are positioned at one common location remote from the material or waste inlet points 2. In particular the sensors may be positioned in or adjacent the collection central 5 to remotely detect the prevailing material transport conditions of the system 1. In FIG. 5 are shown two examples of alternative central positions for the sensors 11, 12 in or at the collection central 5. The sensors 11, 12 may thus be positioned to sense material transport conditions either in the main piping 4, immediately upstream of the collection central 5 or directly upstream of the vacuum source 6, in piping 13 connecting the vacuum source 6 and a collection tank 7. Such a central positioning of the sensors is most cost effective by reducing the number of required sensors to a minimum. However, in accordance with the present technology it may also be considered to position the material transport condition sensors at other locations, such as at or preferably immediately downstream of the branch intersections I.

It shall be emphasized that the present technology is not restricted to the exemplifying pressure sensor 11 for sensing the system pressure during inlet point emptying operations and air speed sensor 12 for sensing air speed through the system during inlet point emptying operations. In further developments of the present technology other appropriate means may be utilized for sensing and determining system pressure and air speed. An example thereof is to continuously measure operational parameters of the vacuum source 6, such as load and RPM of an exhauster, and to calculate system pressure and air speed values therefrom. In a system 1 having multiple branches B1, B2, B3, B4, the sensors 11, 12 sense pressure and air speed in the branch that has been activated by opening the associated air inlet/air inlet valve AV1-AV3 and, in applicable cases, a respective sequencing valve. For each material inlet point 2 emptying operation, the material transport conditions of the activated system 1 or of an activated branch of the system 1 are thus remotely sensed by the sensors 11, 12.

Figure 3:
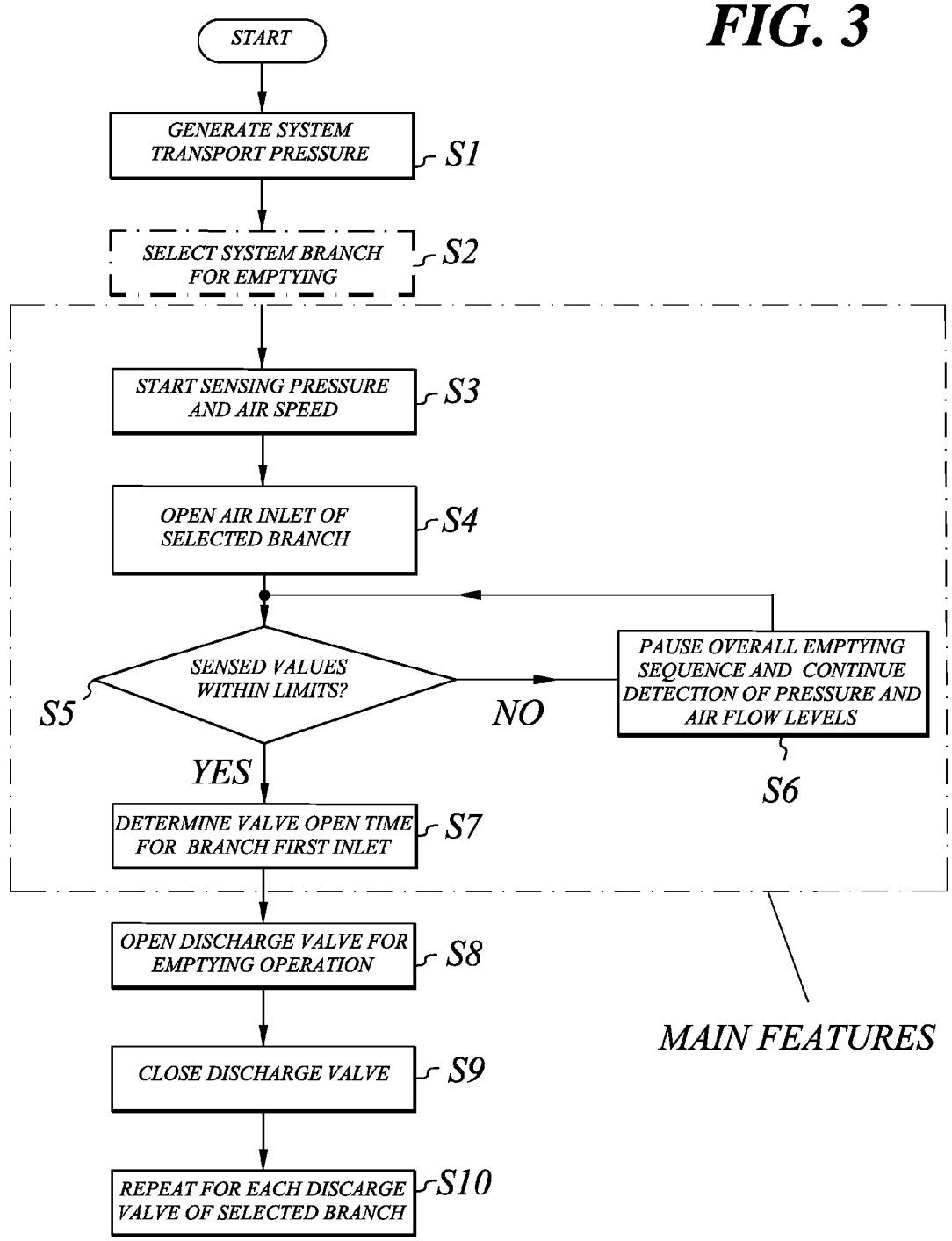
FIG. 3 is a schematic flow diagram of an exemplary method of operating a pneumatic conveying system.

With reference to the schematic flow diagram of FIG. 3, a basic idea is to suggest a method of controlling operation of a pneumatic conveying system 1 as described in connection with FIG. 2. The method will here be described for a system comprising multiple branches but is likewise applicable to single branch systems. Once the material conveying system 1 has been activated in step S1, e.g. by starting the exhausters 6 generating a transport vacuum pressure in the system, the system branch B1-B4 to be emptied first in a system is selected in step S2. The selection of the first system branch to be emptied, as well as other sequencing selections mentioned above, may be performed in optional manners, such as by the overall control system 15. The selected branch will be activated, e.g. by opening an associated air inlet/air inlet valve AV1-AV3 in step S4. Before initiating an emptying operation in the selected branch, sensing of the pressure and air speed values of the system 1 is started. Said sensing is continuously performed by the sensors 11, 12 in step S3, at least during the full extent of each system emptying operation, to determine existing system material transport conditions.

In order to lower costs by simplifying the system configuration, sensing of the material transport conditions is preferably performed at one or more remote locations with regard to the material inlet points 2 of the system 1. In said step S4 the selected system branch is activated so that transport conditions may be determined for the system main piping 4 and the selected system branch. In step S5 the sensed pressure and air speed values are fed to and processed by a control circuit 16 illustrated in the schematic block diagram of FIG. 4. The control circuit includes means 17 for processing feedback from the transport condition sensors 11, 12 to evaluate the transport conditions in the system main piping 4 and the selected system branch. In step S6 the result (OK or NOT OK) of this evaluation is output to a clock or other process timer of the overall control system 15 controlling the overall emptying sequence of the system 1 based on optional system parameters. In a situation where the sensed pressure and air speed values are not within limits, this indicates that acceptable transport conditions are not prevailing in the system 1. As a result, in said step S6, a signal is output from the control circuit 17 pausing the process timer of the overall control system 15.

As soon as the sensed pressure and air speed values are within limits the emptying operation continues. Based on the continuous processing of feedback from the transport condition sensors 11, 12 a valve open time determining means 18 of the processing means 17 in step S7 determines a valve open time for the discharge valve 3 of the first material inlet point 2 of the selected branch B1-B4. The emptying of the first material inlet point 2 of the branch is then performed in steps S8 and S9 by opening and again closing the discharge valve 3.

The overall system emptying operation then continues in step S10 by determining a valve open time for each material inlet point 2 of the selected branch. Pressure and air speed are then sensed in each remaining branch B1-B4 of the system 1 and valve open times for the material inlet point 2 discharge valves 3 of each branch are likewise determined based on the processing of feedback from pressure and air speed sensors 11, 12, as described.

By sensing local pressure and air speed values for the several material inlet points 2 by means of sensors 11, 12 positioned at one common location remote from the material inlet points 2 a very cost efficient system is obtained. In short the emptying process is performed by activating each branch B1-B4 of the system 1 by opening an associated air inlet/air inlet valve AV1-AV3 to enable air flow through said branch. A valve open time for the first material inlet point 2 discharge valve 3 of the branch is then determined based on the processing of feedback from the material transport condition sensors. Valve open times for successive material inlet point discharge valves of said branch and then of other activated branches are determined based on the processing of feedback from the material transport condition sensors.

Characteristic of the suggested emptying process is the obtained dynamic time and frequency with respect to open decisions for material inlet point discharge valves. At this point shall be clarified that the term valve open time, as used herein, is defined as the discharge valve opening and closing time and thereby the period that the respective discharge valve is open. The dynamics are adapted to keep optimal material loading ratio, by speeding up the process when the loading ratio is low and slowing down the process when there is a risk for overload. The process uses remote pressure/air speed feedback so that one set of sensors can be used to control multiple material inlet point discharge valves of several system branches. This means that the vacuum waste collection system can be operated in a very energy-efficient manner.

Figure 4:
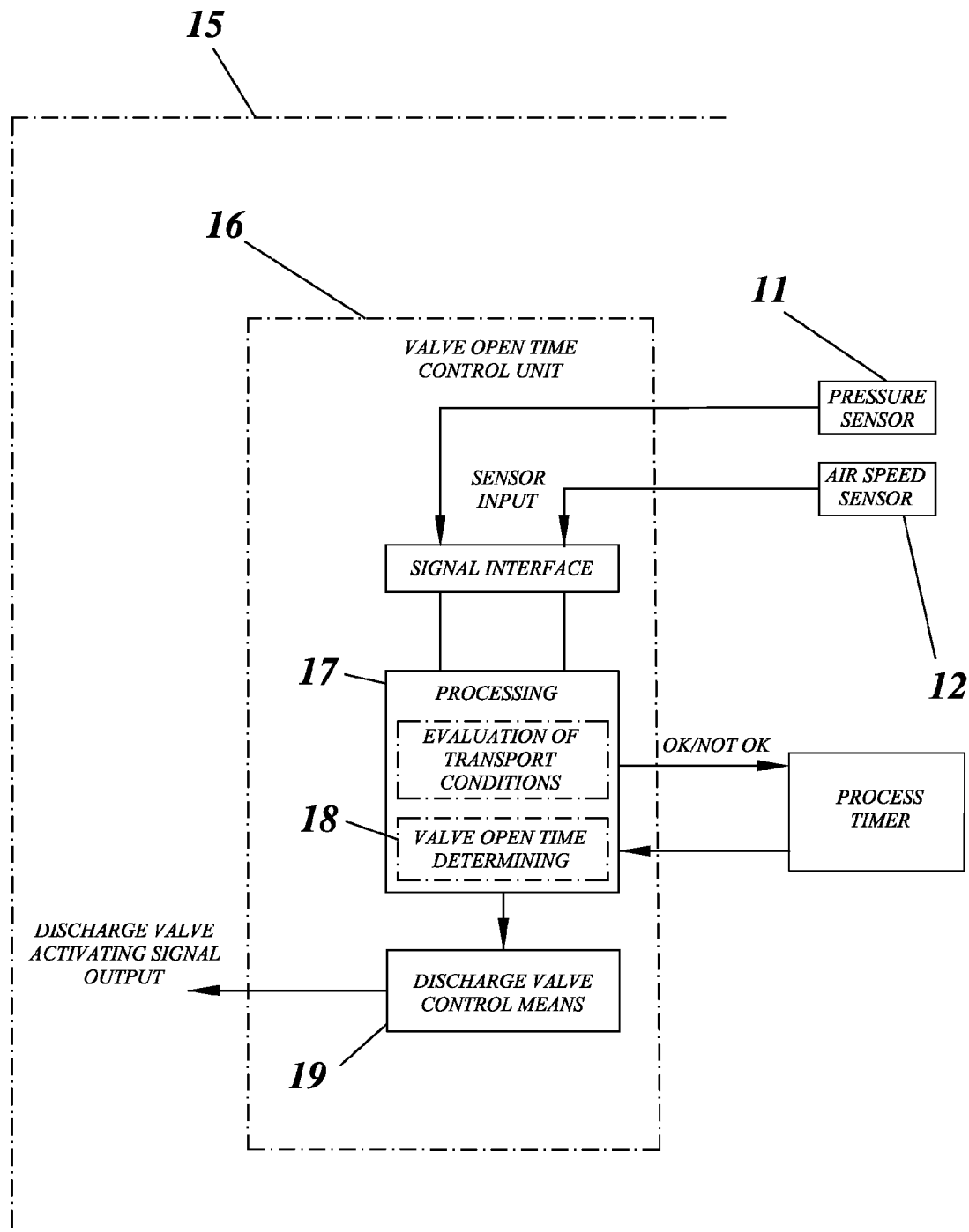
FIG. 4 is a schematic drawing of an example of a computer-implemented control system.

With reference to FIG. 4, a control circuit 16 is preferably integrated in the overall control system 15 of the pneumatic conveying system 1. The control circuit 16 is configured to determine material inlet point 2 discharge valve 3 open times in dependence of the sensed system transport conditions and more specifically also to determine the frequency of successive material inlet point discharge valve open times based on the sensed system transport conditions and thus on the system material load. Feedback from the material transport condition sensors 11, 12, i.e. the remotely sensed pressure and air speed values, is continuously sent to the control circuit 16. Via a signal interface in the control circuit 16 the feedback is received by means 17 for processing feedback from the transport condition sensors, thereby performing an evaluation of the material transport conditions based on the transport condition sensor feedback. The processing means 17 further includes means 18 for determining a valve open time for each selected material inlet point 2 discharge valve 3 based on the output from the feedback processing means 17.

Specifically, the valve open time determining means 18 determine valve open times for the material inlet point 2 discharge valves 3 of the active branch B1, B2, B3, B4 of the system 1. Calculated valve open time values are output to a discharge valve control means 19 for controlling valve open time of the selected material inlet point discharge valves. In other words, from the valve control means 19 is output discharge valve activating signals in dependence upon determined valve open times. Opening and closing of discharge valves 3 of selected material inlet points 2 is performed when the sensed values are within predetermined limits indicating that acceptable system transport conditions exist.

As was mentioned above the overall control system 15 normally selects the branch/discharge valve emptying sequences and thus sends a signal controlling the discharge valve to be activated by the discharge valve open time determining means 18 that frees the transfer of a corresponding activation signal to the selected discharge valve 3 when the sensed values are within predetermined limits. In a corresponding manner the discharge valve open time determining means 18 sends a signal pausing a sequence clock/sequence timer of the overall control system 15 when the sensed values are outside predetermined limits. This will halt the emptying sequence until the transport conditions are again acceptable. It will also influence the discharge valve closing time and thus the normally static (for such conventional overall control systems) period during which a discharge valve remains open.

In alternative, but not specifically illustrated embodiments of the invention variations of the different illustrated parts of the inventive units may be employed without departing from the scope of the invention. Examples of this are the applicability to systems of generally different configuration, with optional numbers of branches and/or material inlet points. It shall also be emphasized that although the invention has been described and illustrated with specific reference to an application in a waste transport system, the invention is in no way restricted to such applications. The basic principles of the invention may be applied to other pneumatic material conveying systems.

The invention has been described in connection with what is presently considered the most practical and preferred embodiments, but it is to be understood that the invention is not limited to the disclosed embodiments. The invention likewise covers any feasible combination of features described and illustrated herein. It is therefore intended to cover various modifications and equivalent arrangements included within the spirit and scope of the appended claims.

The invention claimed is:

1. A method of controlling operation of a pneumatic conveying system having a source for generating, in an active state thereof, material transport pressure in the conveying system, transport piping and multiple material inlet points being provided in each of a number of branches of the transport piping and communicating with the conveying system through associated discharge valves controlling an emptying operation of associated material inlet points, wherein transport air flow is enabled in the branches by opening associated air inlets, the method comprising:

sensing, for each of a number of material inlet point emptying operations, material transport conditions of the conveying system;

sensing the material transport conditions using means for sensing and determining pressure and air speed of the conveying system at one or more remote locations with regard to the material inlet points; and determining, for each of the number of material inlet point emptying operations, a valve open time for the discharge valve of the material inlet point based on a processing of sensed and determined pressure and air speed values.

2. The method according to claim 1, further comprising:

sensing pressure and air speed in each of the number of branches of the conveying system; and determining a valve open time for the discharge valves of the branches based on the processing of the sensed and determined pressure and air speed values.

3. The method according to claim 1, further comprising:

sensing local pressure and air-speed values for several material inlet points using sensors positioned at one common location remote from the material inlet points for collecting pneumatically transported material.

4. The method according to claim 3, further comprising:

determining a valve open time for a first discharge valve of each of the number of branches of the conveying system based on the processing of feedback from the sensors.

5. The method according to claim 4, further comprising:

determining a valve open time for successive discharge valves of each of the number of branches of the conveying system based on the processing of feedback from the sensors.

6. A pneumatic conveying system comprising:

a source for generating transport air flow in an active state thereof;

transport piping coupled to the source;

multiple material inlet points that are provided in at least one branch of the transport piping and that communicate with the conveying system through associated discharge valves controlling an emptying operation of associated material inlet points;

means for sensing and determining system pressure and air speed provided at one or more remote locations with regard to the material inlet points of the conveying system and arranged in communication with the transport piping for sensing material transport conditions of the conveying system;

means for processing sensed and determined pressure and air speed values;

means for determining a valve open time for the discharge valves of the transport piping; and discharge valve control means for outputting discharge valve activating signals in dependence upon determined valve open times.

7. The pneumatic conveying system according to claim 6, further comprising:

a pressure sensor for sensing the system pressure during inlet point emptying operations; and an air speed sensor for sensing air speed through the system during inlet point emptying operations.

8. The pneumatic conveying system according to claim 7, wherein the pressure and air speed sensors are positioned at one common location remote from the material inlet points for collecting pneumatically transported material.

9. A system for controlling operation of a pneumatic conveying system including a source for generating transport air flow in an active state thereof, transport piping and multiple material inlet points that are provided in at least one branch of the transport piping and that communicate with the conveying system through associated discharge valves controlling an emptying operation of associated material inlet points, the system comprising:

means for remote sensing and determining of system pressure and air speed values of the conveying system during inlet point emptying operations;

means for processing pressure and air speed values from the means for sensing and determining system pressure and air speed values of the conveying system;

means for determining a valve open time for each discharge valve of the transport piping; and discharge valve control means for outputting discharge valve activating signals in dependence upon determined valve open times.

10. The system according to claim 9, wherein the means for determining a valve open time for each discharge valve is configured to determine the discharge valve open time in dependence of the sensed system pressure and air speed values and to determine the frequency of successive discharge valve open times based on the sensed system pressure and air speed values.

* * * * *